United States Patent
Kaikkonen et al.

(10) Patent No.: US 12,342,182 B2
(45) Date of Patent: Jun. 24, 2025

(54) TIME BASED VALIDITY FOR BEAM MANAGEMENT WITH CONNECTED MODE DISCONTINUOUS RECEPTION

(71) Applicant: Nokia Technologies Oy, Espoo (FI)

(72) Inventors: Jorma Kaikkonen, Oulu (FI); Timo Koskela, Oulu (FI); Sami Hakola, Kempele (FI)

(73) Assignee: Nokia, Espoo (FI)

( * ) Notice: Subject to any disclaimer, the term of this patent is extended or adjusted under 35 U.S.C. 154(b) by 387 days.

(21) Appl. No.: 16/646,802

(22) PCT Filed: Sep. 14, 2018

(86) PCT No.: PCT/FI2018/050668
§ 371 (c)(1),
(2) Date: Mar. 12, 2020

(87) PCT Pub. No.: WO2019/053340
PCT Pub. Date: Mar. 21, 2019

(65) Prior Publication Data
US 2020/0229002 A1 Jul. 16, 2020

Related U.S. Application Data

(60) Provisional application No. 62/559,150, filed on Sep. 15, 2017.

(51) Int. Cl.
*H04W 16/28* (2009.01)
*H04W 24/08* (2009.01)
(Continued)

(52) U.S. Cl.
CPC .......... *H04W 16/28* (2013.01); *H04W 24/08* (2013.01); *H04W 24/10* (2013.01);
(Continued)

(58) Field of Classification Search
CPC ..... H04W 16/28; H04W 76/28; H04W 24/08; H04W 24/10; H04W 56/001;
(Continued)

(56) References Cited

U.S. PATENT DOCUMENTS

2014/0064160 A1* 3/2014 Verger ............. H04W 52/0216
370/329
2016/0254901 A1* 9/2016 You .................... H04W 52/0229
370/281
(Continued)

FOREIGN PATENT DOCUMENTS

CN 106464450 A 2/2017
WO WO-2014172306 A2 * 10/2014 ........... H04W 24/08
(Continued)

OTHER PUBLICATIONS

Nokia, "Measurements for mobility management", Sep. 12, 2017, 3GPP Draft, R1-1716528, pp. 1-17 (Year: 2017).*
(Continued)

*Primary Examiner* — Chuong M Nguyen
(74) *Attorney, Agent, or Firm* — Ph C. Drish; McCarter & English, LLP

(57) ABSTRACT

Systems, methods, apparatuses, and computer program products for beam management reporting in connected mode discontinuous reception (C-DRX) are provided. One method includes configuring a user equipment (UE) in connected mode discontinuous reception (C-DRX) with a timer that determines at least one of when the UE monitors physical downlink control channel (PDCCH) from channel state information reference signal (CSI-RS) based beams or when the UE monitors PDCCH from synchronization signal block (SSB) based beams.

26 Claims, 5 Drawing Sheets

(51) Int. Cl.
  *H04W 24/10* (2009.01)
  *H04W 56/00* (2009.01)
  *H04W 72/044* (2023.01)
  *H04W 72/23* (2023.01)
  *H04W 76/28* (2018.01)

(52) U.S. Cl.
  CPC ....... *H04W 56/001* (2013.01); *H04W 72/046* (2013.01); *H04W 72/23* (2023.01); *H04W 76/28* (2018.02)

(58) Field of Classification Search
  CPC .............. H04W 72/042; H04W 72/046; H04B 7/0695; H04B 7/08; H04B 7/0617; H04L 69/28
  See application file for complete search history.

(56) References Cited

U.S. PATENT DOCUMENTS

| | | | |
|---|---|---|---|
| 2016/0294531 A1 | 10/2016 | Loehr et al. | 5/57 |
| 2017/0208523 A1 | 7/2017 | Yang et al. | |
| 2017/0251456 A1 | 8/2017 | Radulescu et al. | |
| 2017/0251518 A1* | 8/2017 | Agiwal | H04W 76/28 |
| 2017/0331670 A1* | 11/2017 | Parkvall | H04J 11/0056 |
| 2017/0332300 A1* | 11/2017 | Choi | H04W 88/08 |
| 2018/0007574 A1* | 1/2018 | Park | H04W 36/0085 |
| 2018/0020503 A1* | 1/2018 | Deenoo | H04W 72/046 |
| 2018/0107263 A1* | 4/2018 | Touboul | G06F 1/3209 |
| 2018/0227899 A1* | 8/2018 | Yu | H04B 7/088 |
| 2018/0337757 A1* | 11/2018 | Noh | H04L 27/26 |
| 2020/0037398 A1* | 1/2020 | Adachi | H04W 16/26 |
| 2020/0322854 A1* | 10/2020 | Ryoo | H04W 36/0085 |
| 2021/0112622 A1* | 4/2021 | Koskela | H04W 76/28 |
| 2021/0185754 A1* | 6/2021 | Da Silva | H04W 76/19 |

FOREIGN PATENT DOCUMENTS

| | | | | |
|---|---|---|---|---|
| WO | WO-2017067573 A1 * | 4/2017 | ........... | H04B 7/0417 |
| WO | 2017/146535 A1 | 8/2017 | | |
| WO | WO-2018144873 A1 * | 8/2018 | ........... | H04B 7/0695 |

OTHER PUBLICATIONS

Nokia NPL "Measurements for mobility management", 3GPP R1-1716528, internet https://www.3gpp.org/ftp/TSG_RAN/WG1_RL1/TSGR1_AH/NR_AH_1709/Docs/R1-1716528.zip, retrieved on Sep. 12, 2017 (Year: 2017).*
InterDigital NPL "C-DRX Beam Management Aspects", 3GPP R2-1701187, Feb. 13-17, 2017 (Year: 2017).*
Nokia "Measurements for mobility management", 3GPP R1-1716528, available for retrieval in 3GPP portal on Sep. 12, 2017 (Year: 2017).*
Samsung "NR C-DRX Operations with Beam Management", 3GPP R2-1701994, Feb. 13-17, 2017 (hereinafter "Samsung") (Year: 2017).*
Nokia "Measurements for mobility management", 3GPP R1-1716528, Sep. 12, 2017 (Year: 2017).*
Extended European Search Report received for corresponding European Patent Application No. 18856209.4, dated Jun. 24, 2021, 8 pages.
"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321, V14.3.0, Jun. 2017, pp. 1-107.
International Search Report and Written Opinion received for corresponding Patent Cooperation Treaty Application No. PCT/FI2018/050668, dated Nov. 28, 2018, 18 pages.
"Measurements for Mobility Management", 3GPP TSG-RAN1 NR AH#3, R1-1716528, Agenda : 6.1.5.1, Nokia, Sep. 18-21, 2017, 17 pages.
"C-DRX Beam Management Aspects", 3GPP TSG-RAN WG2 Meeting #97, R2-1701187, Agenda : 10.2.1.4, InterDigital Communications, Feb. 13-17, 2017, 3 pages.
"NR C-DRX Operations with Beam Management", 3GPP TSG-RAN WG2 2017 RAN2#97 Meeting, R2-1701994, Agenda : 10.2.1.4, Samsung, Feb. 13-17, 2017, 5 pages.
Office action received for corresponding Korean Patent Application No. 2020-7010913, dated Feb. 26, 2021, 6 pages of office action and no pages of Translation available.

* cited by examiner

TIME BASED VALIDITY FOR BEAM MANAGEMENT WITH CONNECTED MODE DISCONTINUOUS RECEPTION

RELATED APPLICATION

This application was originally filed as PCT Application No. PCT/FI2018/050668, filed on 14 Sep. 2018, which claims priority from U.S. Provisional Application No. 62/559,150, filed on 15 Sep. 2017, each of which is incorporated herein by reference in its entirety.

BACKGROUND

Field

Embodiments of the invention generally relate to wireless or cellular communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio (NR) access technology. Some embodiments may generally relate to NR physical layer design, for example.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (Evolved-UTRAN), the air interface design, protocol architecture and multiple-access principles are new compared to that of UTRAN, and no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity (DC).

Long Term Evolution (LTE) or E-UTRAN improved efficiency and services, offers lower costs, and provides new spectrum opportunities, compared to the earlier generations. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD). Carrier aggregation or said dual connectivity further allows operating on multiple component carriers at the same time hence multiplying the performance such as data rates per user.

As mentioned above, LTE may also improve spectral efficiency in networks, allowing carriers to provide more data and voice services over a given bandwidth. Therefore, LTE is designed to fulfill the needs for high-speed data and media transport in addition to high capacity voice support. Advantages of LTE include, for example, high throughput, low latency, FDD and TDD support in the same platform, an improved end-user experience, and a simple architecture resulting in low operating costs.

Certain further releases of 3GPP LTE (e.g., LTE Rel-10, LTE Rel-11) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers. The next releases of 3GPP LTE (e.g. LTE Rel-12, LTE Rel-13, LTE Rel-14, LTE Rel-15) are targeted for further improvements of specialized services, shorter latency and meeting requirements approaching the 5G.

$5^{th}$ generation (5G) or new radio (NR) wireless systems refer to the next generation (NG) of radio systems and network architecture. 5G is also known to appear as the IMT-2020 system. It is estimated that 5G will provide bitrates on the order of 10-20 Gbit/s or higher. 5G will support at least enhanced mobile broadband (eMBB) and ultra-reliable low-latency-communication (URLLC). 5G is also expected to increase network expandability up to hundreds of thousands of connections. The signal technology of 5G is anticipated for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. In 5G or NR, the Node B or eNB may be referred to as a next generation or 5G Node B (gNB).

SUMMARY

One embodiment is directed to a method that may include configuring a UE in C-DRX with a timer that determines when the UE monitors PDCCH from CSI-RS based beams and/or when the UE monitors PDCCH from SSB based beams.

Another embodiment is directed to an apparatus that may include at least one processor and at least one memory including computer program code. The at least one memory and the computer program code may be configured, with the at least one processor, to cause the apparatus at least to configure a UE in C-DRX with a timer that determines when the UE monitors PDCCH from CSI-RS based beams and/or when the UE monitors PDCCH from SSB based beams.

Another embodiment is directed to a method that may include receiving, at a UE, a configuration for a timer that determines when the UE monitors PDCCH from CSI-RS based beams and/or when the UE monitors PDCCH from SSB based beams.

Another embodiment is directed to an apparatus that may include at least one processor and at least one memory including computer program code. The at least one memory and the computer program code may be configured, with the at least one processor, to cause the apparatus at least to receive a configuration for a timer that determines when the apparatus monitors PDCCH from CSI-RS based beams and/or when the apparatus monitors PDCCH from SSB based beams.

BRIEF DESCRIPTION OF THE DRAWINGS

For proper understanding of the invention, reference should be made to the accompanying drawings, wherein.

DETAILED DESCRIPTION

Figure 1A:
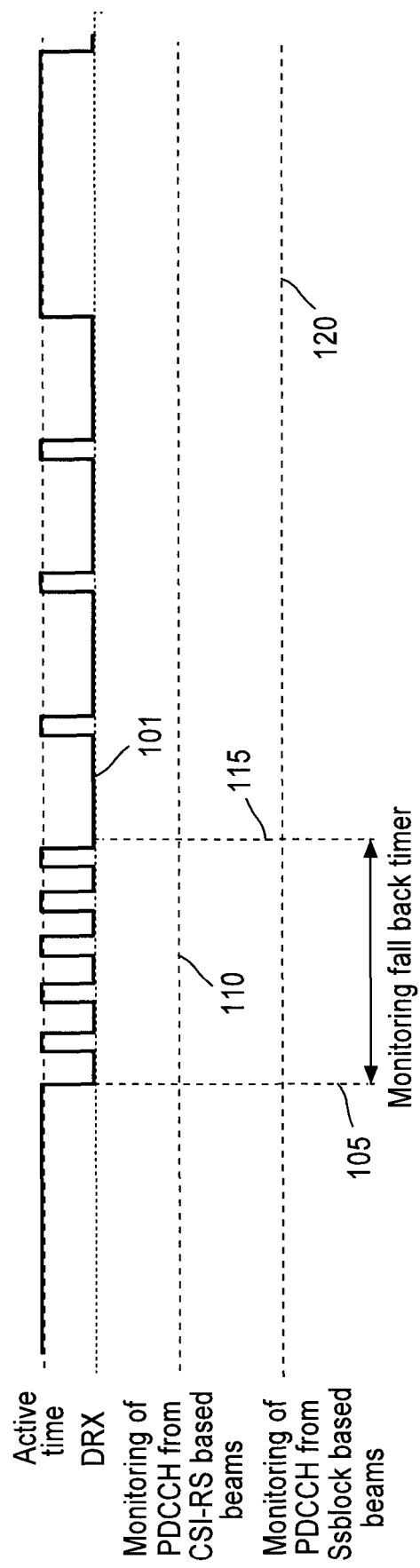
FIG. 1a illustrates an example diagram depicting the monitoring of a fallback timer, according to one embodiment.

It will be readily understood that the components of the invention, as generally described and illustrated in the figures herein, may be arranged and designed in a wide variety of different configurations. Thus, the following detailed description of the embodiments of systems, methods, apparatuses, and computer program products relating to beam management reporting in connected mode discontinuous reception (C-DRX), as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

As mentioned above, certain embodiments relate to 3GPP NR physical layer design. More specifically, some embodiments are directed to UE behaviour when performing beam management reports while configured with connected mode discontinuous reception (C-DRX).

LTE C-DRX was designed to allow a UE to monitor physical downlink control channel (PDCCH) in a discontinuous manner according to the rules and parameters defined in 3GPP TS 36.321, Section 5.7. When a UE is not required to monitor PDCCH, it may turn off its receiver hardware and reduce the receiver power consumption. According to certain embodiments, a drx-Inactivity Timer parameter determines how soon after the ceasing of downlink (DL) and/or uplink (UL) activity the UE may start to apply the discontinuous PDCCH monitoring. Once the drx-InactivityTimer has expired, the UE may be required to monitor the PDCCH only during onDurationTimer once every DRX cycle. Two different DRX cycles can be configured, shortDRX-Cycle (optional) and longDRX-Cycle. The PDCCH discontinuous monitoring pattern according to shortDRX-Cycle may be applied first (if configured) and may be followed by longDRX-Cycle. The onDurationTimer may determine the minimum active time that a UE needs to monitor the PDCCH (unless not required by other rules) every DRX cycle. When there is no shortDRX-Cycle defined or the drxShortCycleTimer (determining how soon after applying short DRX cycle UE may start to use long DRX cycle) has expired, the UE may start to monitor PDCCH in a discontinuous manner according to longDRX-Cycle. Another relevant rule in the context of certain embodiments is that if the UE is indicated by the PDCCH a new transmission (either in DL or in UL), the UE may need to re-start the drx-InactivityTimer.

3GPP has reached certain agreements related to C-DRX and channel state information reference signal (CSI-RS) measurement with L3 mobility. This includes that a UE is not required to measure CSI-RS configured for L3 mobility outside the active time. It is noted that the exact definition of C-DRX active time depends on RAN2. In this context, the active time referred by RAN1 relates to the time when the UE is monitoring PDCCH in onDuration or due to any timer triggered by gNB activity, for example, when any of 'onDurationTimer', 'drx-InactitivityTimer' or 'drx-RetransmissionTimer' is running. It is for further study whether CSI-RS for L3 mobility is configured only within C-DRX UE's active time for C-DRX operation, and/or whether UE should not assume that configured CSI-RS resources for L3 mobility are present outside the active time.

In addition, agreements on reference signals (RS) that could be used for beam management (BM) were reached. Support L1-reference signal received power (RSRP) reporting of measurements on synchronization signal (SS) block for beam management procedures. The following configurations for L1-RSRP reporting for beam management are supported: SS block only (with mandatory support by UE), CSI-RS only (with mandatory support by UE), and SS block+CSI-RS independent L1 RSRP reporting. Joint L1-RSRP using QCL-ed SS-block+CSI-RS is optionally supported by UE (with optionally support by UE).

Agreements on DRX include that a MAC entity can be in one DRX state (i.e., single on/off time) at any given time; it is for further study whether multiple configuration are supported. When MAC entity is awake, it monitors "PDCCH" occasion. As outlined above, in NR, a DRX configuration is described by at least the following configuration parameters: an on duration time, an inactivity time, a retransmission time, short DRX cycles, long DRX cycles.

The UE operation in C-DRX has not yet been fully agreed in 3GPP, but based on L3 mobility decisions, it may be assumed that a UE will not be required to monitor CSI-RS for BM outside the active time. As synchronization signal blocks (SSBs) are appearing in fixed locations and may be required for new cell detection etc., it could still be anticipated that a UE may perform BM measurements based on them even when in DRX (i.e. outside active time). This creates a problem if there are two type of beams, one associated with CSI-RS for BM measurements, and others associated with SSB (SS block). For those beams associated with CSI-RS, a UE would likely be required to track only while in active time (i.e., when also monitoring PDCCH), while the SSB based beams may be monitored effectively also while outside of active time. The consequence of this would be that, with long DRX cycles (and low data activity), a UE would in practice loose the track of the CSI-RS based beams.

However, as data activity, and therefore DRX state associated with UE activity, is a variable that cannot be easily predicted, it may be desirable to configure a UE with both type of beams, so that once/when data activity is high, the UE could report more refined beams.

It is noted that, typically, SSB are sent to wide beams to improve the efficiency and reduce associated overhead, while CSI-RS can be used to track more UE-specific, narrower beams. Also, it is noted that some beams may have association with CORESET i.e. could be used by network to transmit PDCCH for the UE, while other beams would not, but would be candidates for beam management.

Certain embodiments provide that, based on C-DRX state, a UE may fall back to use only SSB based beams for measurements and monitoring. Additionally, in an embodiment, the UE does not trigger reporting based on 'old' CSI-RS based measurements.

According to one embodiment, when C-DRX is configured, a UE may be configured with a period/timer that determines whether the UE should resort to only monitoring those beams which reference RS is SSB, and/or whether the UE should only monitor the PDCCH from beams associated with SSB when entering to onDuration (i.e., when the UE active time according to the DRX cycle starts). In an embodiment, the network (e.g., an eNB or gNB) may specifically set the period/timer for each configured beam. In some embodiments, the configured beam(s) would not be limited to a beam associated to SSB only but also certain/specific beams even if associated with CSI-RS (e.g., 'wide beam' with CSI-RS as reference). In certain embodiments described herein, the configured period/timer may be referred to as a fallback timer.

Once active time ends (i.e., the inactivity timer expires) and the UE starts to have active time based on shortDRXcycle, the UE may also start monitoring a fallback timer. While the fallback timer is running, the UE may continue monitoring the CSI-RS based PDCCH beam(s). Once the fallback timer expires, the UE may resort to monitoring the SSB based PDCCH beam. In some examples, a UE may be configured with both CSI-RS based PDCCH beam(s) and SSB based PDCCH beam(s) and then, when fallback timer expires, the UE would cease monitoring the CSI-RS based PDCCH beam(s) and continue monitoring (only) SSB based PDCCH beam(s).

For beam management procedures, such as for beam management reporting, the configured period/timer may also determine the validity of obtained measurements. In an embodiment, the UE does not report or do any triggering based on measurement results which are older than the configured period/timer. As a result, according to certain embodiments, all results applied for report/evaluation should be obtained with in certain time of the reporting/evaluation event. According to an embodiment, when a UE is C-DRX and the measurements are becoming more spaced, the configured period/timer may be used to determine which measurement results can be considered in the evaluation.

FIG. 1a illustrates an example diagram depicting the monitoring of a fallback timer, according to one embodiment. In the example of FIG. 1a, a UE is configured with C-DRX with the active time shown by line 101. Once active time ends (i.e., the inactivity timer expires) and the UE starts to have active time based on shortDRXcycle, the UE may also start the monitoring of the fallback timer at 105. While the fallback timer is running, the UE may continue monitoring the CSI-RS based PDCCH beam(s) as shown at 110. Once the fallback timer expires at 115 (in the figure also the shortDRXcycle application ends and UE falls to longDRX cycle as an example), the UE may resort to monitor the SSB based PDCCH beam as shown at 120.

Figure 1B:
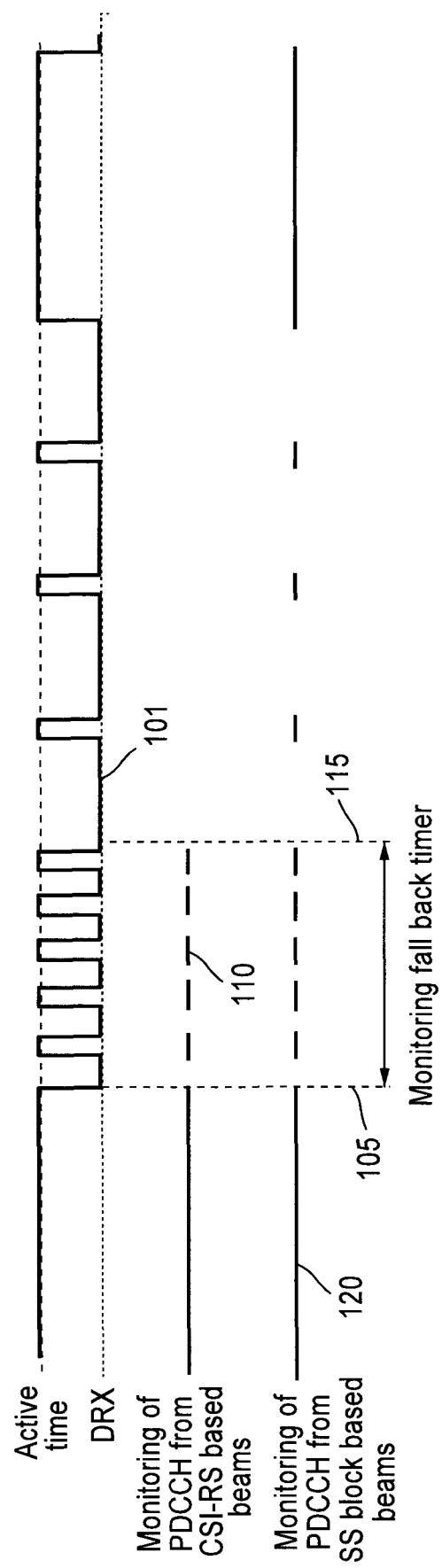
FIG. 1b illustrates an example diagram depicting the monitoring of a fallback timer, according to another embodiment.

FIG. 1b illustrates an example diagram depicting the monitoring of a fallback timer, according to another embodiment. Similar to FIG. 1a, in the example of FIG. 1b, a UE is configured with C-DRX with the active time shown by line 101. Once active time ends (i.e., the inactivity timer expires) and the UE starts to have active time based on shortDRXcycle, the UE may also start the monitoring of the fallback timer at 105. In the embodiment of FIG. 1b, the UE may be configured with both CSI-RS based PDCCH beam(s) and SSB based PDCCH beam(s) and then, when fallback timer expires at 115, the UE would cease monitoring the CSI-RS based PDCCH beam(s) 110 and continue monitoring (only) SSB based PDCCH beam(s) 120.

As the UE is not likely to be required to monitor the CSI-RS outside the active time (and CSI-RS might not be even present outside the UE active time), it is likely that tracing of those beams becomes challenging. On the other hand, since SSB have typically wider beams and are always present, the UE is therefore likely to be able to trace those beams even when having long DRX cycles, ensuring that connection can be maintained.

In an embodiment, once the fallback timer expires, the UE may maintain the latest CSI-RS measurement for N milliseconds (or subframes, slots/symbols). According to this embodiment, in case the latest SS block measurement (e.g., RSRP which can be measured from secondary synchronization signal (SSS), Primary synchronization signal (PSS) and Physical Broadcast Channel Demodulation Reference Signals (PBCH DMRS) in any combination), differs N dB from the previous measurement, the UE may discard CSI-RS measurement and would not consider those measurements in the reporting/event triggering.

According to one embodiment, it may be defined that when a UE enters long DRX, it may discard the CSI-RS measurements and cancel any triggered timers related to CSI-RS events. These may be, for example, beam management events based on CSI-RS. In one option, in case the UE performs recovery and/or indicates a switch to an alternative SS block based on radio resource management (RRM) measurements that lead to event triggering based on SSB (switch/recovery). In an embodiment, a SS Block may be comprised of PSS, SSS, and PBCH (including PBCH DMRS).

Figure 2:
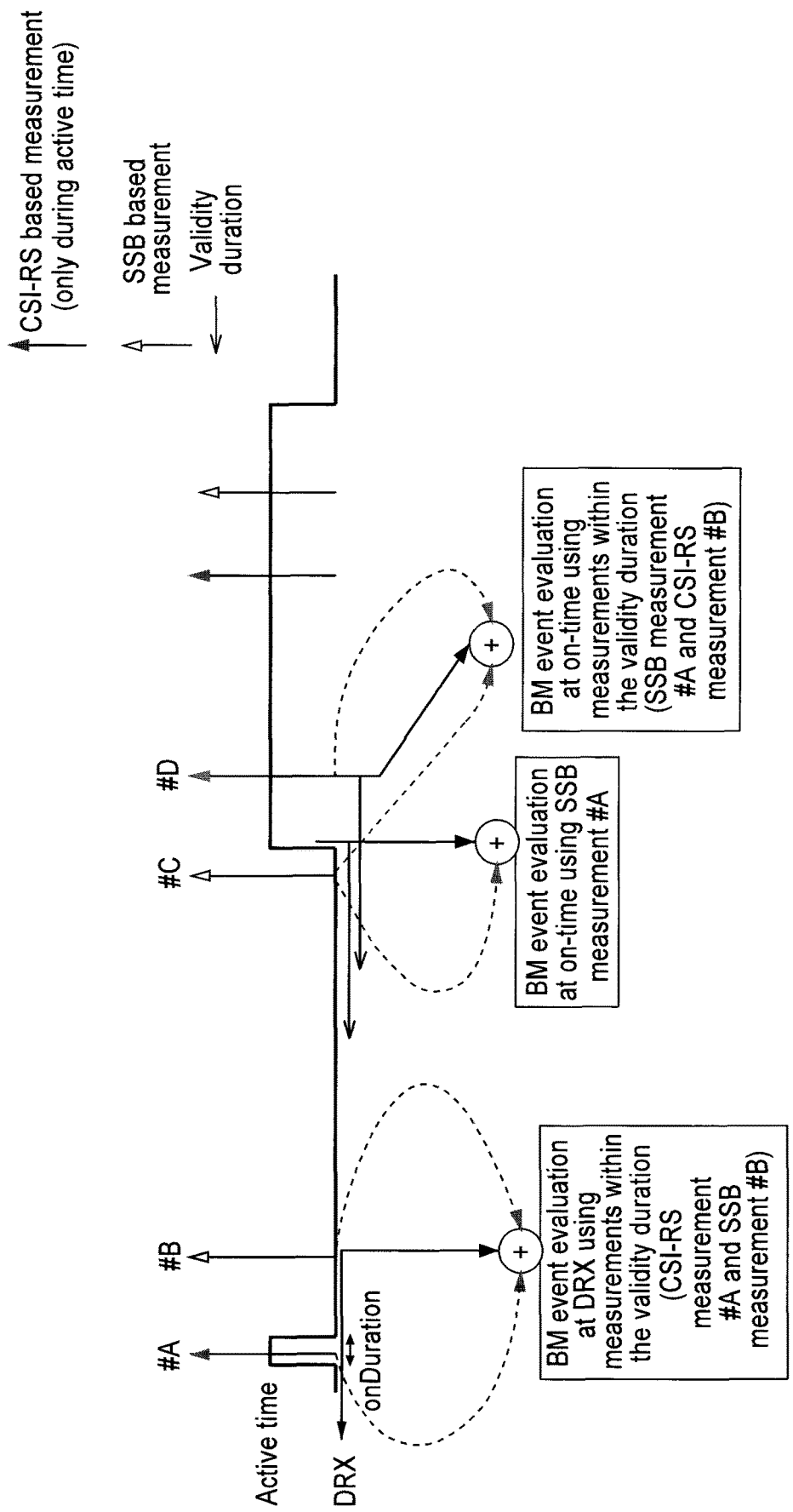
FIG. 2 illustrates an example diagram depicting a measurement validity timer, according to another embodiment.

FIG. 2 illustrates an example diagram depicting a measurement validity timer, according to another embodiment. The timer/duration behaviour illustrated in the example of FIG. 2 depicts a situation where a UE is in C-DRX and the measurements are becoming spaced (e.g., as UE might not be required to measure CSI-RS outside the active time). The timer/duration may be used to determine which measurement results can be considered in the evaluation.

It is noted that, although not illustrated in FIG. 2, once the passed active time has exceeded the validity duration, it may be either considered that all measurements are valid or that the validity timer is still applied (neglecting too old results) to ensure that measurements that infrequent would not affect, e.g., the event evaluation. An alternative embodiment of the measurement validity duration may be to configure a measurement validity timer. In this embodiment, when obtaining a measurement on either SS block or CSI-RS, a UE may initiate a timer T1. When the timer expires, the measurement is considered not to be valid anymore and the measurement result is ignored. Timer T1 value may be fixed in the specification or the value can be configured by the network, for example individually for SS block and CSI-RS in a similar manner as the validity period can be the same or different for CSI-RS and SS Block measurements.

Furthermore, considering the measurement validity duration illustrated in FIG. 2, a measurement such as the CSI-RS measurement # A may trigger another timer called TTT (Time to Trigger) timer. A TTT timer may be used to evaluate whether a specific criteria for beam management action, such as beam reporting, is fulfilled. In one example, when measurement results are above a specific threshold signal value the TTT timer keeps running. When the TTT expires at configured duration, UE considers that a configured event such as beam report is triggered. Considering the relation to the validity timer, if a configured TTT timer value is shorter than or equal to the validity timer and no new measurement is obtained before the TTT expires (to evaluate whether TTT can be kept running), the event is considered to be valid. In case the TTT timer value is longer that the validity period and the validity timer expires and TTT is still running, and no new measurement is received to evaluate TTT, the TTT timer is stopped and the event is considered to be invalid. Different events (e.g., different evaluation of event triggering criteria and TTT) can be configured for SS Block and CSI-RS.

Figure 3A:
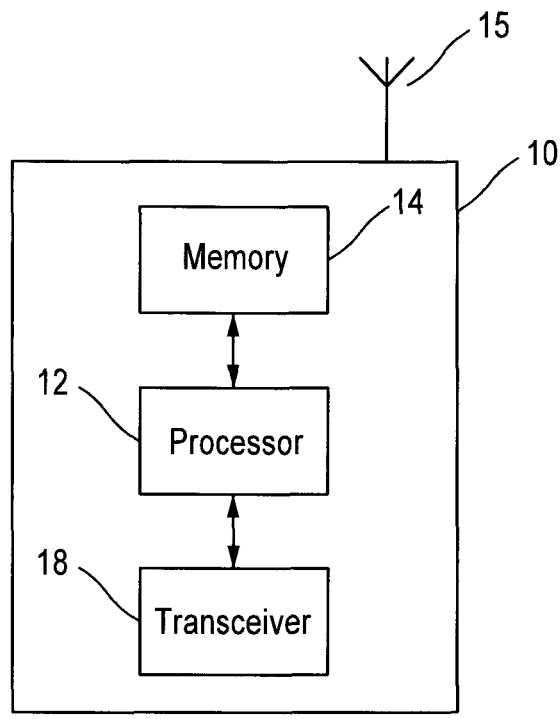
FIG. 3a illustrates a block diagram of an apparatus, according to one embodiment.

FIG. 3a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), or subscription server associated with a radio access network, such as a GSM network, LTE network, 5G or NR.

It should be understood that apparatus 10 may be comprised of an edge cloud server as a distributed computing system where the server and the radio node may be standalone apparatuses communicating with each other via a radio path or via a wired connection, or they may be located in a same entity communicating via a wired connection. It should be noted that one of ordinary skill in the art would understand that apparatus 10 may include components or features not shown in FIG. 3a.

As illustrated in FIG. 3a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 3a, multiple processors may be utilized according to other embodiments. For example, it should be understood that, in certain embodiments, apparatus 10 may include two or more processors that may form a multiprocessor system (i.e., in this case processor 12 represents a multiprocessor) that may support multiprocessing. In certain embodiments, the multiprocessor system may be tightly coupled or loosely coupled (e.g., to form a computer cluster).

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein.

In one embodiment, apparatus 10 may be controlled by memory 14 and processor 12 to configure a UE with a timer that may determine when the UE monitors PDCCH from CSI-RS based beams and/or when the UE monitors PDCCH from SSB based beams. In one embodiment, the timer may be started when the active time ends and the UE begins a short DRX cycle. According to certain embodiments, while the timer is running, the UE may continue monitoring the CSI-RS based PDCCH beams. In an embodiment, when the timer expires, the UE may start monitoring the SSB based PDCCH beams.

According to some embodiments, apparatus 10 may be controlled by memory 14 and processor 12 to set the timer specifically for each configured beam. In an embodiment, the configured beam may not just be limited to a beam associated with SSB but also certain beams associated with CSI-RS.

In certain embodiments, apparatus 10 may also be controlled by memory 14 and processor 12 to configure the timer to be used to determine the validity of obtained measurements. For example, the duration of the timer may be used to determine whether measurement results are still valid. In one embodiment, apparatus 10 may also be controlled by memory 14 and processor 12 to configure the UE such that it is prevented from reporting or performing any event triggering based on measurement results that are older than or obtained prior to the start of the timer. Thus, in such embodiments, results applied for reporting and/or evaluation should be obtained within a certain time of the reporting/evaluation event. As one example, in an embodiment, when the timer expires, apparatus 10 may also be controlled by memory 14 and processor 12 to configure the UE to maintain the latest CSI-RS measurement for N milliseconds (or subframes, slots/symbols). If the latest SSB measurement (e.g., RSRP), differs N dB from the previous measurement, then the UE may be configured to discard CSI-RS measurement and to not consider those measurements in the reporting/event triggering. In another example, when UE enters long DRX, the UE may be configured to discard the CSI-RS measurements and cancel any triggered timers related to CSI-RS events (e.g., beam management events based on CSI-RS).

Figure 3B:
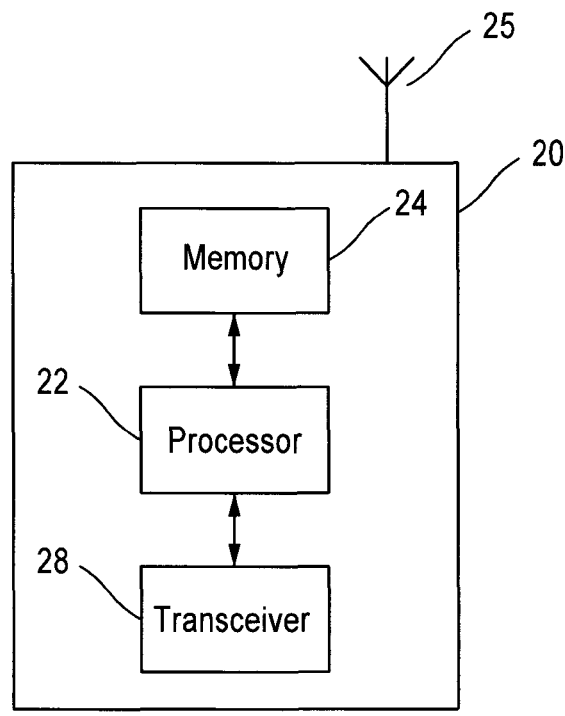
FIG. 3b illustrates a block diagram of an apparatus, according to another embodiment.

FIG. 3b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, and the like), one or more radio access components (for example, a modem, a transceiver, and the like), and/or a user interface.

In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and any other radio access technologies. It should be noted that one of ordinary skill in the art would understand that apparatus 20 may include components or features not shown in FIG. 3b.

As illustrated in FIG. 3b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3b, multiple processors may be utilized according to other embodiments. For example, it should be understood that, in certain embodiments, apparatus 20 may include two or more processors that may form a multiprocessor system (i.e., in this case processor 22 represents a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. For example, in some embodiments, apparatus 20 may be configured to perform one or more of the processes depicted in any of the flow charts or signaling diagrams described herein.

According to one embodiment, apparatus 20 may be controlled by memory 24 and processor 22 to receive a configuration for a timer that may determine when the apparatus 20 monitors PDCCH from CSI-RS based beams and/or when the apparatus 20 monitors PDCCH from SSB based beams. In one embodiment, apparatus 20 may be controlled by memory 24 and processor 22 to start the timer when its active time ends and a short DRX cycle begins. According to certain embodiments, while the timer is running, apparatus 20 may be controlled by memory 24 and processor 22 to continue monitoring the CSI-RS based PDCCH beams. In an embodiment, when the timer expires, apparatus 20 may be controlled by memory 24 and processor 22 to start monitoring the SSB based PDCCH beams.

According to some embodiments, the timer may be specifically set for each configured beam. In an example embodiment, the configured beam may not just be limited to a beam associated with SSB but also certain beams associated with CSI-RS.

In certain embodiments, the timer may be configured to be used to determine the validity of obtained measurements by apparatus 20. For example, the duration of the timer may be used to determine whether measurement results are still valid. In one embodiment, apparatus 20 may be controlled by memory 24 and processor 22 to not report or perform any event triggering based on measurement results that are older than or obtained prior to the start of the timer. Thus, in such embodiments, results applied for reporting and/or evaluation should be obtained within a certain time of the reporting/evaluation event. As one example, in an embodiment, when the timer expires, apparatus 20 may be controlled by memory 24 and processor 22 to maintain the latest CSI-RS measurement for N milliseconds (or subframes, slots/symbols). If the latest SSB measurement (e.g., RSRP), differs N dB from the previous measurement, then apparatus 20 may be controlled by memory 24 and processor 22 to discard CSI-RS measurement and to not consider those measurements in the reporting/event triggering. In another example, when apparatus 20 enters long DRX, apparatus 20 may be controlled by memory 24 and processor 22 to discard the CSI-RS measurements and cancel any triggered timers related to CSI-RS events (e.g., beam management events based on CSI-RS).

Figure 4A:
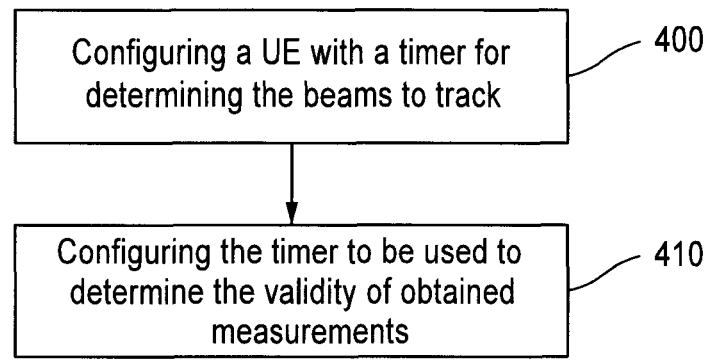
FIG. 4a illustrates an example flow diagram of a method, according to an embodiment.

FIG. 4a illustrates an example flow diagram of a method, according to one example embodiment. The method may be performed by a network node, such as a base station, eNB, gNB, or access node, for example. The method of FIG. 4a may include, at 400, configuring a UE with a timer that may determine when the UE monitors PDCCH from CSI-RS based beams and/or when the UE monitors PDCCH from SSB based beams. In one embodiment, the timer may be started when the active time ends and the UE begins a short DRX cycle. According to certain embodiments, while the timer is running, the UE may continue monitoring the CSI-RS based PDCCH beams. In an embodiment, when the timer expires, the UE may start monitoring the SSB based PDCCH beams.

According to some embodiments, the configuring 400 may include setting the timer specifically for each configured beam. In an embodiment, the configured beam may not just be limited to a beam associated with SSB but also certain beams associated with CSI-RS.

In certain embodiments, the method may also include, at 410, configuring the timer to be used to determine the validity of obtained measurements. For example, the duration of the timer may be used to determine whether measurement results are still valid. In one embodiment, the configuring 410 may include configuring the UE such that it is prevented from reporting or performing any event triggering based on measurement results that are older than or obtained prior to the start of the timer. Thus, in such embodiments, results applied for reporting and/or evaluation should be obtained within a certain time of the reporting/evaluation event. As one example, in an embodiment, when the timer expires, the configuring 410 may include configuring the UE to maintain the latest CSI-RS measurement for N milliseconds (or subframes, slots/symbols). In this example, if the latest SSB measurement (e.g., RSRP), differs N dB from the previous measurement, then the UE may be configured to discard CSI-RS measurement and to not consider those measurements in the reporting/event triggering. In another example, when UE enters long DRX, the configuring 410 may include configuring the UE to discard the CSI-RS measurements and cancel any triggered timers related to CSI-RS events (e.g., beam management events based on CSI-RS).

Figure 4B:
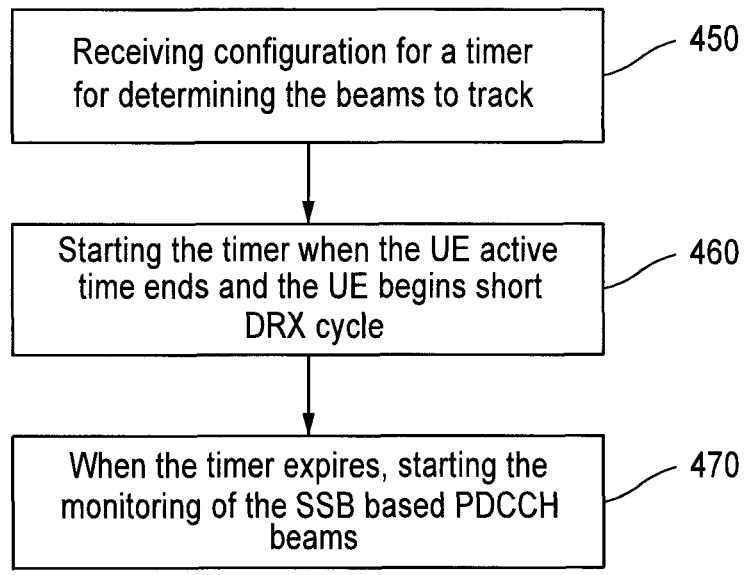
FIG. 4b illustrates an example flow diagram of a method, according to another embodiment.

FIG. 4b illustrates an example flow diagram of a method, according to one example embodiment. The method may be performed by a UE or mobile station, for example. In an embodiment, the method may include, at 450, receiving at a UE a configuration for a timer that may determine when the UE monitors PDCCH from CSI-RS based beams and/or when the UE monitors PDCCH from SSB based beams. In one embodiment, the method may include, at 460, starting the timer when the UE active time ends and the UE begins short DRX cycle. According to certain embodiments, while the timer is running, the method may include continuing the monitoring of the CSI-RS based PDCCH beams. In an embodiment, when the timer expires, the method may include, at 470, starting the monitoring of the SSB based PDCCH beams.

According to some embodiments, the timer may be specifically set for each configured beam. In an example embodiment, the configured beam may not just be limited to a beam associated with SSB but also certain beams associated with CSI-RS.

In certain embodiments, the timer may be configured to be used to determine the validity of obtained measurements by the UE. For example, the duration of the timer may be used to determine whether measurement results are still valid. In one embodiment, the method may include the UE not reporting or performing any event triggering based on measurement results that are older than or obtained prior to the start of the timer. Thus, in such embodiments, results applied for reporting and/or evaluation should be obtained within a certain time of the reporting/evaluation event. As one example, in an embodiment, when the timer expires, the method may include maintaining the latest CSI-RS measurement for N milliseconds (or subframes, slots/symbols). If the latest SSB measurement (e.g., RSRP), differs N dB from the previous measurement, then the method may include discarding CSI-RS measurement and not considering those measurements in the reporting/event triggering. In another example, when the UE enters long DRX, the method may include discarding the CSI-RS measurements and canceling any triggered timers related to CSI-RS events (e.g., beam management events based on CSI-RS).

In view of the above, embodiments of the invention provide several technical effects and/or improvements and/or advantages. For example, certain embodiments improve beam measurement reporting operation. In addition, certain embodiments can improve system performance. As a result, certain embodiments can improve performance and throughput of devices and network nodes including, for example, base stations, eNBs, gNBs and/or UEs. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In certain embodiments, an apparatus may be included or be associated with at least one software application, module, unit or entity configured as arithmetic operation(s), or as a program or portions of it (including an added or updated software routine), executed by at least one operation processor. Programs, also called computer program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments described herein. The one or more computer-executable components may include at least one software code or portions of code. Modifications and configurations required for implementing the functionality of an embodiment may be performed as routine(s), which may be implemented as added or updated software routine(s). In some embodiments, software routine(s) may be downloaded into the apparatus.

Software or a computer program code or portions of code may be in a source code form, object code form, or in some intermediate form, and may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and/or software distribution package, for example. Depending on the processing power needed, the computer program may be executed in a single electronic digital device or it may be distributed amongst a number of devices or computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation(s) and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. An apparatus comprising:
   at least one processor; and
   at least one memory storing instructions that, when executed by the at least one processor, cause the apparatus at least to:
   configure a user equipment with at least one timer that is used to determine when the user equipment monitors at least one physical downlink control channel from a first set of beams during at least one duration of the at least one timer, and from a second set of beams in response to and after expiration of the at least one timer;
   configure the at least one timer to be used to determine a validity of at least one obtained channel state information reference signal based measurement or at least one obtained synchronization signal block based measurement;
   wherein the user equipment is configured in connected mode discontinuous reception;
   wherein the first set of beams from which the user equipment monitors the at least one physical downlink control channel during the at least one duration of the at least one timer comprises one or more channel state information reference signal based physical downlink control channel beams;
   wherein at least one channel state information reference signal is used to perform at least one measurement of the at least one physical downlink control channel;

wherein the second set of beams from which the user equipment monitors the at least one physical downlink control channel in response to and after expiration of the at least one timer comprises one or more synchronization signal block based physical downlink control channel beams;

wherein the at least one timer is configured such that the at least one obtained channel state information reference signal based measurement is considered valid during the at least one duration of the at least one timer;

wherein the at least one timer is configured such that the at least one obtained channel state information reference signal based measurement is considered invalid after expiration of the at least one timer; and configure the user equipment to discard the at least one obtained channel state information reference signal based measurement obtained based on the one or more channel state information reference signal based physical downlink control channel beams and not perform reporting or event triggering based on the at least one obtained channel state information reference signal based measurement obtained based on the one or more channel state information reference signal based physical downlink control channel beams, in response to expiration of the at least one duration of the at least one timer.

2. The apparatus according to claim 1, wherein the monitoring of the at least one physical downlink control channel comprises the user equipment performing the at least one measurement.

3. The apparatus according to claim 1, wherein the at least one timer is started when an active time of the user equipment ends and the user equipment begins a discontinuous reception cycle.

4. The apparatus according to claim 1, wherein the instructions, when executed by the at least one processor, cause the apparatus at least to set the at least one timer specifically for each configured beam.

5. The apparatus according to claim 1, wherein the instructions, when executed by the at least one processor, cause the apparatus at least to:
configure the at least one timer as a fallback timer.

6. The apparatus of claim 1, wherein:
the at least one timer is configured such that the at least one obtained channel state information reference signal based measurement is considered valid when the at least one obtained channel state information reference signal based measurement is obtained during the at least one duration of the at least one timer, and
the at least one timer is configured such that the at least one obtained channel state information reference signal based measurement is considered invalid when the at least one obtained channel state information reference signal based measurement is obtained after expiration of the at least one timer.

7. The apparatus of claim 1, wherein the at least one memory stores instructions that, when executed by the at least one processor, cause the apparatus at least to:
configure the user equipment to not report, or to not perform event triggering, based on channel state information reference signal based measurement results that are obtained prior to the start of the at least one timer.

8. The apparatus of claim 1, wherein the at least one memory stores instructions that, when executed by the at least one processor, cause the apparatus at least to:
configure the user equipment to determine a first reference signal received power associated with a channel state information reference signal, wherein the at least one obtained channel state information reference signal based measurement comprises the first reference signal received power;

configure the user equipment to determine a second reference signal received power associated with a synchronization signal block, wherein the at least one obtained synchronization signal block based measurement comprises the second reference signal received power;

configure the user equipment to determine a difference between the first reference signal received power associated with the channel state information reference signal and the second reference signal received power associated with the synchronization signal block; and configure the user equipment to discard the at least one obtained channel state information reference signal based measurement after an amount of time, in response to the difference between the first reference signal received power associated with the channel state information reference signal and the second reference signal received power associated with the synchronization signal block being larger than a threshold.

9. The apparatus of claim 1, wherein beams of the first set of beams, from which the user equipment monitors the at least one physical downlink control channel during the at least one duration of the at least one timer, comprising the one or more channel state information reference signal based physical downlink control channel beams are narrower than beams of the second set of beams, from which the user equipment monitors the at least one physical downlink control channel in response to and after expiration of the at least one timer comprising the one or more synchronization signal block based physical downlink control channel beams.

10. The apparatus of claim 1, wherein:
the timer is started when an active time of the user equipment ends and the user equipment begins a first discontinuous reception cycle, and
the timer ends when the first discontinuous reception cycle ends and the user equipment begins a second discontinuous reception cycle.

11. The apparatus of claim 10, wherein the first discontinuous reception cycle comprises discontinuous reception periods that are shorter than discontinuous reception periods of the second discontinuous reception cycle.

12. The apparatus of claim 10, wherein the first discontinuous reception cycle comprises monitoring periods that substantially equal to monitoring periods of the second discontinuous reception cycle.

13. The apparatus of claim 10, wherein the at least one memory stores instructions that, when executed by the at least one processor, cause the apparatus at least to:
discard at least one obtained channel state information reference signal based measurement upon entering the second discontinuous reception cycle.

14. The apparatus of claim 1, wherein the at least one memory stores instructions that, when executed by the at least one processor, cause the apparatus at least to:
configure the user equipment to cancel one or more triggered timers related to channel state information reference signal events in response to and after expiration of the at least one duration of the at least one timer.

15. The apparatus of claim 1, wherein the first set of beams from which the user equipment monitors the at least one physical downlink control channel during the at least one duration of the at least one timer additionally comprises the one or more synchronization signal block based physical downlink control channel beams.

16. An apparatus, comprising:
at least one processor; and
at least one memory storing instructions that, when executed by the at least one processor, cause the apparatus at least to:
configure at least one timer that is used to determine when the apparatus monitors at least one physical downlink control channel from a first set of beams during at least one duration of the at least one timer, and from a second set of beams in response to and after expiration of the at least one timer;
wherein the apparatus is configured in connected mode discontinuous reception;
wherein the first set of beams from which the apparatus monitors the at least one physical downlink control channel during the at least one duration of the at least one timer comprises one or more channel state information reference signal based physical downlink control channel beams;
perform at least one measurement of the at least one physical downlink control channel using at least one channel state information reference signal;
wherein the at least one timer is configured to be used to determine a validity of at least one obtained channel state information reference signal based measurement or at least one obtained synchronization signal block based measurement;
wherein the second set of beams from which the apparatus monitors the at least one physical downlink control channel in response to and after expiration of the at least one timer comprises one or more synchronization signal block based physical downlink control channel beams;
wherein the at least one timer is configured such that the at least one obtained channel state information reference signal based measurement is considered valid during the at least one duration of the at least one timer;
wherein the at least one timer is configured such that the at least one obtained channel state information reference signal based measurement is considered invalid after expiration of the at least one timer; and
determine to discard the at least one obtained channel state information reference signal based measurement obtained based on the one or more channel state information reference signal based physical downlink control channel beams and not perform reporting or event triggering based on the at least one obtained channel state information reference signal based measurement obtained based on the one or more channel state information reference signal based physical downlink control channel beams, in response to expiration of the at least one duration of the at least one timer.

17. The apparatus according to claim 16, wherein the monitoring of the at least one physical downlink control channel comprises the apparatus performing the at least one measurement.

18. The apparatus according to claim 16, wherein the at least one timer is started when an active time of the apparatus ends and the apparatus begins a discontinuous reception cycle.

19. The apparatus according to claim 16, wherein the at least one timer is configured as a fallback timer.

20. The apparatus of claim 16, wherein the instructions, when executed by the at least one processor, cause the apparatus at least to:
obtain the at least one obtained channel state information reference signal based measurement during the at least one duration of the at least one timer with performing the at least one measurement of the at least one physical downlink control channel using at least one channel state information reference signal;
wherein the at least one timer is configured such that the at least one obtained channel state information reference signal based measurement obtained during the at least one duration of the at least one timer is considered invalid after expiration of the at least one duration of the at least one timer.

21. The apparatus of claim 20, wherein the at least one timer is configured such that the at least one obtained channel state information reference signal based measurement obtained during the at least one duration of the at least one timer is considered valid during the at least one duration of the at least one timer and prior to expiration of the at least one duration of the at least one timer.

22. The apparatus of claim 16, wherein the instructions, when executed by the at least one processor, cause the apparatus at least to:
obtain the at least one obtained synchronization signal block based measurement after expiration of the at least one duration of the at least one timer with performing at least one measurement of the at least one physical downlink control channel with use of a synchronization signal block;
wherein the at least one timer is configured such that the at least one obtained synchronization signal block based measurement obtained after expiration of the at least one duration of the at least one timer is considered valid after expiration of the at least one duration of the at least one timer.

23. A method, comprising:
configuring, by a user equipment, at least one timer that is used to determine when the user equipment monitors at least one physical downlink control channel from a first set of beams during at least one duration of the at least one timer, and from a second set of beams in response to and after expiration of the at least one timer;
wherein the user equipment is configured in connected mode discontinuous reception;
wherein the first set of beams from which the user equipment monitors the at least one physical downlink control channel during the at least one duration of the at least one timer comprises one or more channel state information reference signal based physical downlink control channel beams;
wherein the at least one timer is configured to be used to determine a validity of at least one obtained channel state information reference signal based measurement or at least one obtained synchronization signal block based measurement;
performing at least one measurement of the at least one physical downlink control channel using at least one channel state information reference signal;
wherein the second set of beams from which the user equipment monitors the at least one physical downlink control channel in response to and after expiration of the at least one timer comprises one or more synchronization signal block based physical downlink control channel beams;

wherein the at least one timer is configured such that the at least one obtained channel state information reference signal based measurement is considered valid during the at least one duration of the at least one timer;

wherein the at least one timer is configured such that the at least one obtained channel state information reference signal based measurement is considered invalid after expiration of the at least one timer; and determining to discard the at least one obtained channel state information reference signal based measurement obtained based on the one or more channel state information reference signal based physical downlink control channel beams and not perform reporting or event triggering based on the at least one obtained channel state information reference signal based measurement obtained based on the one or more channel state information reference signal based physical downlink control channel beams, in response to expiration of the at least one duration of the at least one timer.

24. The method according to claim 23, wherein the monitoring of the at least one physical downlink control channel comprises the apparatus performing the at least one measurement.

25. The apparatus according to claim 23, wherein the at least one timer is started when an active time of the apparatus ends and the apparatus begins a discontinuous reception cycle.

26. The apparatus according to claim 23, wherein the at least one timer is configured as a fallback timer.

* * * * *